May 4, 1926.

J. H. BURROW ET AL

Re. 16,341

REPAIR SHIELD

Original Filed Jan. 12, 1924

James H. Burrow
George A. Burrow
INVENTORS

BY

Erwin, Wheeler & Hoolard
ATTORNEYS.

Reissued May 4, 1926.

Re. 16,341

UNITED STATES PATENT OFFICE.

JAMES H. BURROW AND GEORGE A. BURROW, OF SPOKANE, WASHINGTON, ASSIGNORS TO BURROW MANUFACTURING COMPANY, OF SPOKANE, WASHINGTON, A CORPORATION OF WASHINGTON.

REPAIR SHIELD.

Original No. 1,528,044, dated March 3, 1925, Serial No. 685,795, filed January 12, 1924. Application for reissue filed January 16, 1926. Serial No. 81,859.

*To all whom it may concern:*

Be it known that we, JAMES H. BURROW and GEORGE A. BURROW, citizens of the United States, residing at Spokane, in Spokane County and State of Washington, have invented certain new and useful Improvements in Repair Shields, of which the following is a specification.

The present invention relates to improvements in repair shields or boots for use between the outer casing and inner tubes of tires to close a puncture or reinforce a damaged casing. The primary object of the invention is the provision of a device of this character which is comparatively inexpensive in cost of production and which is so fashioned and constructed that it may with facility be applied for use without the necessity for expert knowledge on the part of the user. When in position for use on the inner tube, the shield by its formation and construction readily adjusts itself when the tire is inflated and fits neatly into place to present a smooth structure between the casing and inner tube. Due to the wrapping of the shield about the tube and the formation of the shield when in place, the danger of pinching the inner tube is eliminated, and means are provided whereby the shield is properly positioned and is anchored in this position against displacement within the damaged casing of the tire.

The invention consists in certain novel features of construction and combinations and arrangements of parts for accomplishing the above ends, as will hereinafter be more fully pointed out and claimed.

In the accompanying drawings we have illustrated one complete example of the physical embodiment of our invention wherein the parts are combined and arranged in accordance with the best mode we have so far devised for the practical application of the principles of our invention.

As now in actual use the shields are fashioned in various sizes and are manufactured on suitable mandrels adapted for the purpose in order that they will conform to the curvature of the tire. The shields are prepared or manufactured for shipment and sale in the form shown in Figure 1 of the drawings and they may readily be unrolled from this form for facile application to the tire.

Figure 1:
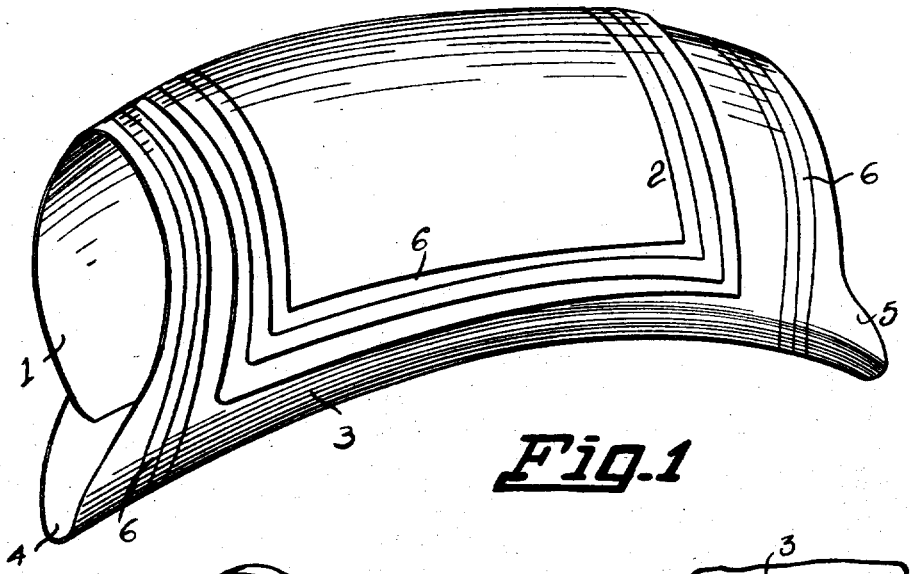
Figure 1 is a perspective view of a shield according to our invention shown in rolled position, ready to be unrolled and wrapped about an inner tube.

The shield as shown is preferably of fabric, either in a single thickness or of cemented layers, and is formed in three portions as the inner narrow portion 1 which is wrapped directly on the tube; the outer wrapper portion 2 which is narrower than the inner portion; and an intermediate anchoring portion 3. The portion 1 is designed to be wrapped on the tube with the intermediate portion 3 at the inner side of the tube, and the wrapper portion 2 is designed to be wrapped around the inner portion as indicated in Figure 1.

Figure 4:
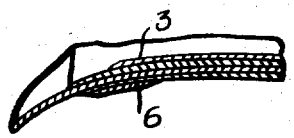
Figure 4 is a detail sectional view, enlarged, showing an edge of the intermediate anchoring portion of the shield.

At its ends the intermediate portion is provided with extensions 4 and 5 projecting beyond the greatest width of the shield, and as seen in Figure 4 these lips or extensions are comparatively thinner than the body of the shield or the anchoring portion 3 in order that they may lie snugly between the tube and the casing of the tire and prevent the former being pinched between the casing and the shield.

Figure 2:
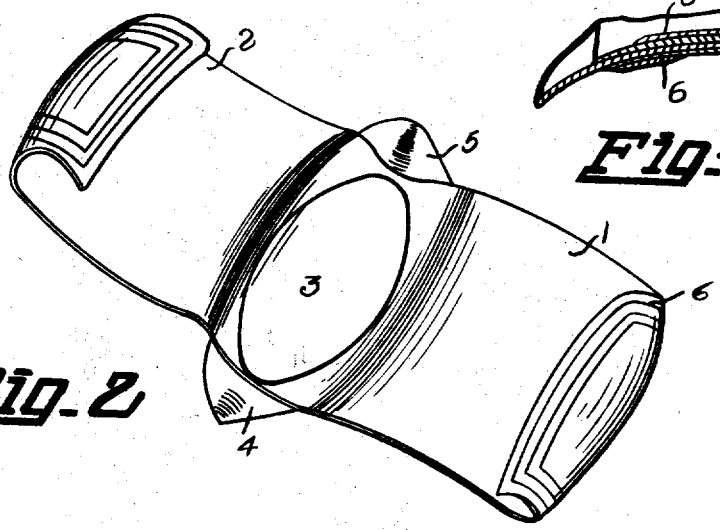
Figure 2 is a view of the shield unrolled and showing the inner face thereof.
Figure 3:
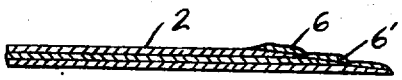
Figure 3 is a detail sectional view, enlarged, showing an edge of the shield.

The outer edges of the shield are also much thinner and more flexible than the body of the shield as indicated in Figure 3 where a rubber strip 6 is cemented to the outer face of the shield. As shown, this strip may be cemented to a layer of the fabric of which the shield is composed. The presence of these comparatively thin and more flexible edges for the shield not only prevents pinching of the tube, but they also insure a smooth joint for the encased shield. The edge strip as indicated in Figure 1 passes around the edge of the shield on its outer face, while the inner face of the shield, as indicated in Figure 2 is a smooth plane face for contact with the inner tube and with the inner wrapped part of the shield.

The shields are of the proper length to be wrapped or passed twice around the tube leaving the ends of the shield free for movement when the tube is inflated in order that the tube may adjust itself to the inflated tire. The intermediate portion 3 however remains stationary at the inner side of the tube and within the casing, and because of its increased thickness and curvature it is less flexible than the wrapper portion of the shield. When the shield has been adjusted to the tube, placed within the casing, and the casing mounted upon the rim in the usual manner, the inflation of the tube will tend to expand the wrapping portions and will also tend to force the anchoring portion against the meeting margins of the rim engaged portion of the casing. The contoured wrapping portions necessarily conform to the surface of the inflated inner tube and to the enclosing casing without any tendency to wrinkle or fold, being interposed between the tube and its casing and normally contoured both longitudinally and in cross section to the form of the arcuate portion of the tube which they embrace. The anchoring portion is similarly contoured to fit between the tube and the casing on the inner side, but is relatively stiff and thick whereby it offers considerable resistance to the pressure of the air in the tube which tends to force this anchoring portion between the marginal portions of the casing. Being on the inner side, its central axis is in an arc within the smallest circle of the tube, and its correspondingly increased curvature, coupled with its comparative rigidity, are material factors in preventing any tendency to creep rotatively, or to become wrinkled or distorted. Thus the intermediate portion becomes anchored at the inner side of the tire tube and remains stationary when the tube is inflated, but permits the two wrapped portions of the shield to adjust themselves as the cross-area of the tube is increased. After the tube has been inflated the shield is held in stationary position and is prevented from creeping around the tire because of the thin flexible edges of the shield which permit a close frictional contact between it and the tube and its casing.

Because of the construction of the shield with its intermediate semi-rigid anchoring portion, which conforms in curvature to the inner portion of the tire tube, expert knowledge in applying the shield is not required, as the utility and applicability of this anchoring portion to the inner portion of the tube will readily be apparent and the anchoring portion could not within reason be placed in the incorrect position with relation to the tube. With the intermediate portion anchored in stationary position it will be apparent that the two ends of the shield are held in close frictional contact and a double hold is secured not only on the shield itself but between the shield and tube and between the shield and casing, to prevent loosening of the shield after the tire has been inflated.

From the above description taken in connection with the drawings it will be evident that we have provided a device of this character which fulfills the condition set forth as the object of our invention, and as is evidenced by the extensive use to which the device has been applied in the market.

Having thus fully described our invention what we claim as new and desire to secure by Letters Patent is—

1. A repair shield having an intermediate anchoring portion adapted to engage the inner side of a tire tube and inner and outer portions one of which is adapted to wrap around the tube and the other to encircle the wrapped portion.

2. A repair shield having an intermediate anchoring portion adapted to engage the inner side of a tire tube, thin, flexible extensions at the ends of said anchoring portion, and said shield having a thin flexible edge strip.

3. A repair shield having a stiff, intermediate anchoring portion and thin flexible extensions on said anchoring portion, an inner integral portion adapted to wrap about a tire tube, an outer integral portion adapted to encircle the inner wrapped portion, and a thin flexible edge strip on said portions.

4. A repair shield having a wrapping portion contoured in conformity with the surfaces of the tire tube to which it is to be applied, in combination with a relatively stiff arcuate anchoring portion having a surface contoured in conformity with the inner side of the tire tube.

5. A repair shield for pneumatic tires, comprising a wrapping portion contoured in conformity with the surfaces of the tire tube to which it is to be applied, in combination with a normally arcuate anchoring portion having a surface normally contoured in conformity with the inner side of the tire tube, said anchoring portion being adapted to resist pressures tending to distort it from its normal contour.

6. A repair shield having a wrapping portion contoured in conformity with the surfaces of the tire tube to which it is to be applied, in combination with a relatively thick arcuate anchoring portion having one surface contoured in conformity with the inner side of the tire tube and another surface adapted to conform generally to the contour of the rim engaged portions of an outer casing for such tube, said anchoring portion having relatively thin flexible end extensions to be engaged between the tube and said portions of the casing beyond the portion of the tube embraced by said wrapping portion.

7. A repair shield having an anchoring portion and a set of wrapping portions, said anchoring and wrapping portions being each contoured to fit between an arcuate portion of a tire tube and its enclosing casing with the anchoring portion interposed between the inner side of the tube and the rim engaged portions of the casing and being relatively thick, intermediate of its ends, as compared with the wrapping portions.

8. A repair shield having an arcuate anchoring portion provided with relatively thin flexible extensions, in combination with an inner wrapping portion adapted to wrap about a tire tube and normally contoured in conformity with the embraced arcuate portion of such tube and an outer wrapping portion adapted to encircle the inner wrapping portion and normally contoured in conformity therewith.

9. A repair shield having an arcuate anchoring portion and connected wrapping portions, each of said portions being contured in normal conformity to the form of an arcuate portion of a tire tube, and said anchoring portion being relatively resistant to distortion from its normal contour.

10. A repair shield having a semi-rigid arcuate anchoring portion normally conforming in curvature to the inner portion of a tire tube and adapted to be received between said tube and the rim engaged portions of an associated casing.

11. A repair shield comprising a pair of wrapping portions normally contoured in general conformity to an arcuate portion of a tire tube to be embraced thereby with the wrapping portions in superposed relation to each other and an arcuate connecting portion normally contoured to fit the inner surface of the tube and connecting the inner margins of the wrapping portions.

JAMES H. BURROW.
GEORGE A. BURROW.